(12) United States Patent
Zhu et al.

(10) Patent No.: US 7,181,764 B2
(45) Date of Patent: *Feb. 20, 2007

(54) SYSTEM AND METHOD FOR A SUBSCRIPTION MODEL TRUSTED EMAIL DATABASE FOR USE IN ANTISPAM

(75) Inventors: Jing Zhu, Fremont, CA (US); George Hu, San Jose, CA (US)

(73) Assignee: Yahoo! Inc., Sunnyvale, CA (US)

(*) Notice: Subject to any disclaimer, the term of this patent is extended or adjusted under 35 U.S.C. 154(b) by 12 days.

This patent is subject to a terminal disclaimer.

(21) Appl. No.: 10/975,698

(22) Filed: Oct. 28, 2004

(65) Prior Publication Data

US 2005/0097321 A1    May 5, 2005

Related U.S. Application Data

(60) Provisional application No. 60/517,414, filed on Nov. 4, 2003.

(51) Int. Cl.
*H04L 9/00* (2006.01)
*G06F 15/00* (2006.01)
*G06F 15/30* (2006.01)

(52) U.S. Cl. ............................ 726/4; 726/14; 726/18; 713/154

(58) Field of Classification Search .............. 726/4, 726/18; 713/154, 156; 709/206
See application file for complete search history.

(56) References Cited

U.S. PATENT DOCUMENTS

| 6,421,709 | B1* | 7/2002 | McCormick et al. | 709/206 |
| 6,650,890 | B1* | 11/2003 | Irlam et al. | 455/412.1 |
| 6,772,196 | B1* | 8/2004 | Kirsch et al. | 709/206 |
| 6,957,259 | B1* | 10/2005 | Malik | 709/225 |
| 2004/0177110 | A1* | 9/2004 | Rounthwaite et al. | 709/202 |
| 2004/0255122 | A1* | 12/2004 | Ingerman et al. | 713/176 |

* cited by examiner

*Primary Examiner*—Nasser Moazzami
*Assistant Examiner*—Pramila Parthasarathy
(74) *Attorney, Agent, or Firm*—Darby & Darby PC; Jamie L. Wiegand (57) ABSTRACT

The invention is directed to implementing a trust rating subscription model for email addresses and/or domains in a trust-oriented email network that is supported by a deployment of a trusted email database (TED) system. The TED maintains the trust rating for individual email addresses relative to the recipients. Also, the subscription model enables the email end users and inbox service providers to register with the TED to obtain the trust rating of a specific email sender relative to the recipient. This trust rating may then be used by the email end user or an inbox service provider to filter spam, if the sender is untrusted, or deliver the message to an inbox, if the sender is trusted. A sender (individual email address, domain, and the like) can also subscribe and obtain limited rights to email subscribers of the TED system.

26 Claims, 5 Drawing Sheets

SYSTEM AND METHOD FOR A SUBSCRIPTION MODEL TRUSTED EMAIL DATABASE FOR USE IN ANTISPAM

CROSS REFERENCE TO RELATED APPLICATIONS

This application claims the benefit of U.S. Provisional Application Ser. No. 60/517,414 filed on Nov. 4, 2003, the benefit of the earlier filing date of which is hereby claimed under 35 U.S.C. § 119(e) and further incorporated by reference.

FIELD OF THE INVENTION

The present invention relates generally to networks, and more particularly to reducing unsolicited electronic messages from unknown senders.

BACKGROUND OF THE INVENTION

Over the last decade, with the advent of the web interface to mail, email-based communication has become a major method of human interaction in the digital world. An email address has increasingly become an important digital identity for many online activities e.g., communicating with friends, participating in discussion groups, and shopping on the web.

However, along with the benefits, email-based communication has come several negative aspects. For example, today, unsolicited and unwanted email (spam) has become a wide spread problem due in part to the ease and low cost of sending spam to millions of email addresses. These unwanted emails waste the time, money, and resources of end users and service providers. In the past, there have been relatively low barriers to spamming, making it difficult to filter out the unsolicited, unwanted messages. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects.

Briefly stated, the invention is directed to implementing a trust rating subscription model for a message address including an email address, a domain, and the like, based, in part, on a relationship with another message address in a predetermined community. A trusted email database (TED) may be employed to maintain a list of message addresses with their associated trust ratings. The trust rating of a message address may be determined based on a variety of mechanisms, including, but not limited to, an underlying message address relationship network around the message address of interest, through various online activities such as message sending, forwarding, deleting, blocking, marking as is/is not spam, saving to an address book, and the like. In one embodiment, there are at least two components of the trust rating between two message addresses. One component of the trust rating employs proximity between two message addresses in a message address relationship graph, which may be referred to as a message address relationship trust. Another component of the trust rating provides a trust value that may be substantially independent of a position of two message addresses in the message address relationship graph, which is also referred to as a universal trust rating. The trust rating may be either positive or negative. A negative trust rating indicates that the sender message address may not to be trusted by the recipient message address.

The subscription model further enables the message end users and inbox service providers to register with the TED to obtain the trust rating of a specific message sender relative to the recipient and use it to filter spam and/or unwanted messages, as well as to ensure that a specific message is delivered as non-spam. Additionally, a sender (individual message address, domain, and the like) can subscribe and obtain an initial good trust rating for limited rights to reach subscribers of the TED system.

Illustrative Operating Environment

Figure 1:
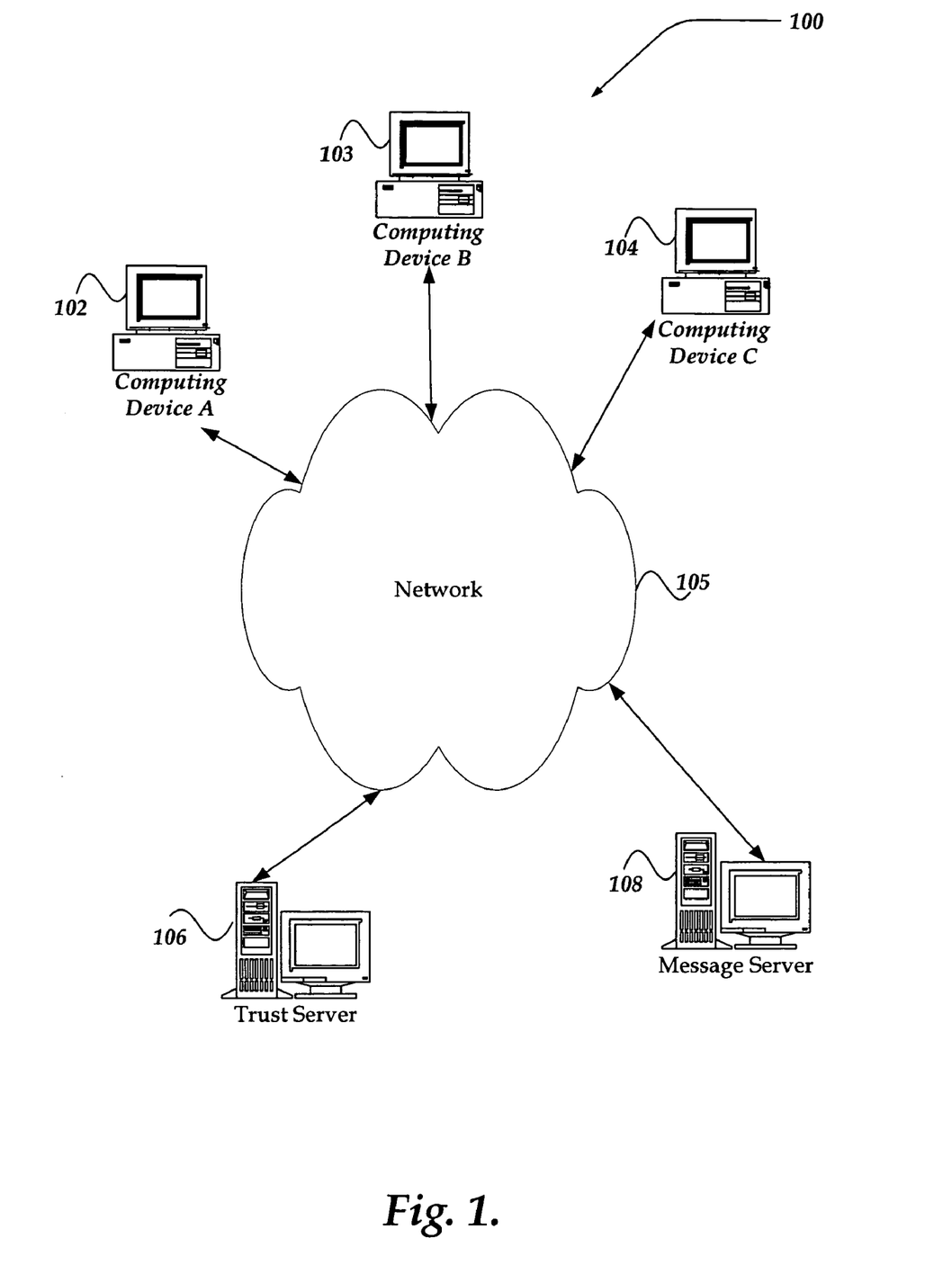
FIG. 1 shows a functional block diagram illustrating one embodiment of an environment for practicing the invention.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102–104, network 105, trust server 106, and message server 108. Network 105 enables communication between client devices 102–104, message server 108, and trust server 106. Although not illustrated, there may be many more or less client devices than shown. Moreover, client devices may be organized based on a variety of criteria, including, but not limited to, a domain association, group association, or the like.

Generally, client devices 102–104 may include virtually any computing device capable of connecting to another computing device to send and receive a message. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client devices 102–104 may be any device that is capable of connecting using a wired or wireless communication medium such as a PDA, POCKET PC, wearable computer, and any other device that is equipped to communicate over a wired and/or wireless communication medium.

Each client device within client devices 102–104 typically includes a message user agent (MUA), or the like, that is configured to enable it to communicate an electronic message with another client, such as client devices 102–104. MUAs employed may include, but are not limited to, Eudora, Outlook, ELM, PINE, web browser, and the like. Client devices 102–104 may further include a message transfer agent (MTA) such as sendmail, or the like, that forwards the electronic message, to a message server, mail server, and the like. For example, the MTA may be configured to communicate electronic mail messages employing message server 108. In another embodiment, the MTA resides within message server 108.

Each client device within client devices 102–104 may have associated with it at least one message address with which it employs to send and receive electronic messages. Each message address may include a sequence of one or more characters that identifies an electronic post office box on a network where an electronic message may be sent. Different types of networks may employ different formats for the message address. On the Internet, for example, message addresses typically employ the format as described in Request for Comments 822 (RFC822). One example of an Internet message address is: john.doe@yahoo.com. The invention is not so limited, however, and virtually any message address format may be employed, without departing from the scope or spirit of the invention.

Client devices 102–104 may further include a client application, and the like, that is configured to manage various actions on behalf of the client device.

Network 105 is configured to couple each client device within client devices 102–104, and the like, with every other client device, with message server 108 and with trust server 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), 4th, 5th, and so forth, generation radio access for cellular systems, Wireless-LAN, Wireless Router (WR) mesh, and the like. Access technologies such as 2G, 3G, and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client devices 102–104, message server 108, and trust server 106, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Message server 108 may include virtually any network device that is configured to provide a "post office" facility for messages. Such post office facility may include, an MTA, such as sendmail, POP server, IMAP server, and similar mail servers. As such, message server 108 may assign to and manage message addresses and server mailboxes for clients 102–104.

Message server 108 may, for example, store incoming messages from a client within clients 102–104 for distribution to another client. Message server 108 may further forward outgoing messages through network 105 to another client within clients 102–104. As such, message server 108 may be implemented on a variety of computing devices including personal computers, desktop computers, multiprocessor systems, microprocessor-based devices, network PCs, servers, network appliances, and the like.

Message server 108 may also operate, as an Internet service provider (ISP), or the like, tot provides a variety of other services to clients 102–104. Message server 108 may, for example, be configured to enable and maintain a network domain of message addresses.

Message server 108 may further operate to receive a message from a client with clients 102–104. Message server 108 may then query trust server 106 to obtain a trust rating between the sender's message address and the recipient's message address. Message server 108 may then employ the trust rating to determine an action. For example, message server 108 may select to drop the message, flag the message as a spam message, bypass all spam filtering and deliver the message, employ its own spam filtering, or the like.

Trust server 106 is described in more detail below in conjunction with FIG. 2. Briefly, however, trust server 106 includes virtually any network device configured to manage a trusted email database (TED) for use in such actions, as detecting unsolicited, unwanted electronic messages, or the like. As such, trust server 106 may be implemented on a variety of computing devices including personal computers, desktop computers, multiprocessor systems, microprocessor-based devices, network PCs, servers, proxy servers, reverse proxy servers, gateways, network appliances, and the like.

Trust server 106 may also be configured to enable client devices 102–104, message server 108, domains associated with client devices 102–104, and the like, to subscribe to the TED to obtain an initial trust rating. In one embodiment, trust server 106 may seek a fee from a subscriber. In one embodiment, trust server 106 may charge a fee for granting message server 108, clients 102–104, and the like, the ability to query a trust rating for message address. This is known as a recipient subscription. The subscribers are typically message address end users or inbox service providers who seek to query the TED to help filter SPAM and to ensure that trusted messages are delivered to an inbox. The message address queried includes a sender address that needs not be to a subscriber of the TED.

Alternatively, senders may also pay a fee to obtain a sender subscription, which enables it to send a predetermined number of messages within a predetermined time to other TED subscribers. Where the subscription is for a domain, message addresses within the domain may be allowed to similarly obtain a sender subscription that allows it to send other TED subscribers up to a predetermined number of messages for the fee. In another embodiment, the domain may further be constrained by a predetermined time period. This subscription model is unlike 'sender-pay' models, however, because it further enables client devices, domains, and the like, that may be known as legitimate with good trust ratings, based on a variety of other criteria, to communicate with other subscribers without paying a fee. It is noted that the TED may be configured not to disclose the email addresses of other TED subscribers. Therefore, a sender subscription is directed towards helping to get an initial good trust rating, rather than obtaining a list of other TED subscribers from the TED.

The "sender" and "recipient" subscriptions may be viewed as orthogonal or independent of each other. A subscriber may maintain both type of subscriptions or either one of them. In addition, a subscriber may be rejected for its "sender" subscription due to its SPAM activity, but still maintain the "recipient" subscription status. For example, spamdomain.com may be rejected as a "sender" subscription due to its spamming activity originating from its domain. However, spamdomain.com might still maintain its "recipient" subscription status to query trust rating for other senders of the messages it receives.

Although trust server 106 and message server 108 are illustrated as distinct servers, the invention is not so limited. For example, the functionality of trust server 106 and message server 108 may operate within a single server, or even be distinct across multiple servers, without departing from the scope or spirit of the invention.

Illustrative Server Environment

Figure 2:
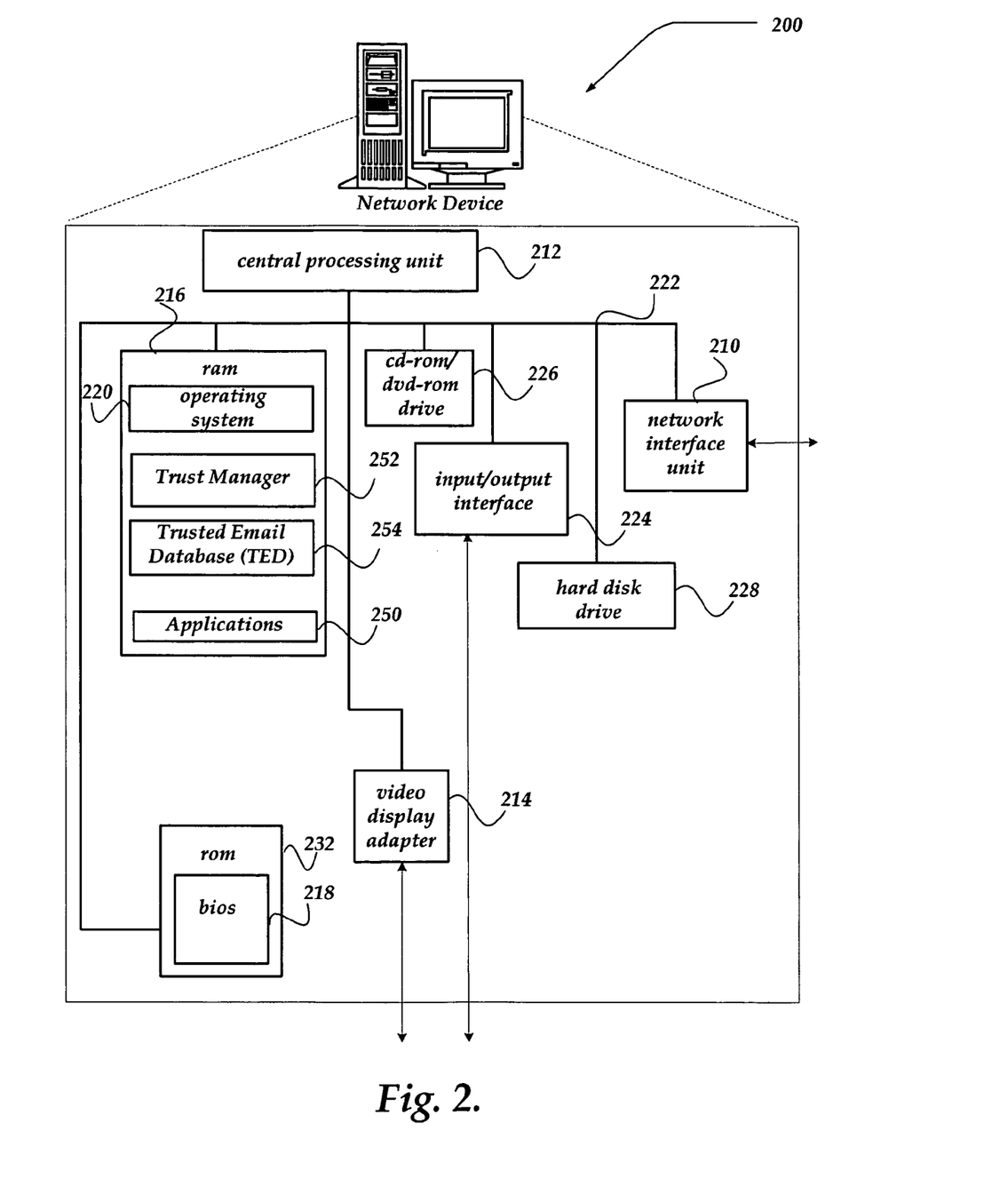
FIG. 2 shows one embodiment of a server device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, trust server 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

Network device 200 may also include an SMTP, POP3, and IMAP handler applications, and the like, for transmitting and receiving electronic messages; an HTTP handler application for receiving and handing HTTP requests; and an HTTPS handler application for handling secure connections.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, communication applications, security applications, administration applications, spreadsheet programs, finance programs, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, SMTP applications, mail services, security programs, spam detection programs, and so forth. Mass storage may further include applications such as trust manager 252 and trusted email database (TED) 254.

TED 254 may include a database, file, spreadsheet, application, folder, and the like, that is configured to receive and store trust information associated with a client device, domain, and the like. TED 254 may receive such trust information from trust manager 252.

Although TED 254 is illustrated as a single component, this need not be the case. For example, where the amount of information collected and stored in TED 254, is expected to be fairly large, TED 254 may be implemented across a distributed structure, such as a distributed database, across several servers, or the like.

Trust manager 252 may be configured to enable client devices, such as client devices 102–104 of FIG. 1, domains associated with such client devices, such as domains managed by message server 108 of FIG. 1, and the like, to subscribe to the TED system and to obtain a trust rating, and to send messages to other TED subscribers. Trust manager 252 may determine whether an initial subscriber is sufficiently legitimate with a good trust rating. Based, in part, on such a determination, trust manager 252 may request an initial fee from the initial subscriber. Trust manager 252 may further configure the initial subscriber with various permissions, including, but not limited, to an ability to send a predetermined number of messages to other TED subscribers within a predetermined period of time, and the like.

Trust manager 252 may be configured to manage a client device's message address trust information and store such trust information in TED 254. Trust manager 252 may receive and store message addresses and their relationships within TED 254. Trust manager 252 may further gather information associated with message addresses, messengers, groups, and the like, and determine a relationship strength between message addresses, groups, and the like.

Trust manager 252 may be configured to gather the information based on a variety of mechanisms, including, when a new message address is registered with it, based on a predetermined schedule, condition, event, and the like. In one embodiment, a fast trust rating query interface may be employed to gather the information at a frequency that is directed towards supporting time critical applications, and the like.

Trust manager 252 may also determine an electronic message address relationship trust between message addresses, groups, and the like. Trust manager 252 may further determine a universal trust rating for a message address based, in part, on a message address relationship trust, existence of a trust rating card, and the like. For example, if spam behavior is detected for the message address, a negative trust rating may be assigned to that message address, or the like, and stored in the trust rating card. If the rating is low enough, the recipient subscribers will recognize the negative ratings from this sender and may drop or filter out the messages. This effectively stops the ability for the sender to send messages to any TED recipient subscribers.

Trust manager 252 may enable a client device, such as client devices 102–104 of FIG. 1, and/or a message server, such as message server 108 of FIG. 1, to subscribe to the TED system and query information from the TED system. Such queried information may include, for example, a composite trust value that the client device may employ to determine whether to accept a message, reject the message, or the like.

Trust manager 252 may also enable subscribers perform a variety of other actions, including but not limited to transferring or sharing a trust rating from one message address to another message address, renewing an infrequently used message address, and the like. Trust manager 252 may include one or more components, modules, programs, and the like, to enable the above actions.

Although illustrated in FIG. 2 as distinct components, trust manager 252 and TED 254 may be arranged, combined, and the like, in any of a variety of ways, without departing from the scope of the invention. For example, components of trust manager 252 may be deployed distinctly. Moreover, components of trust manager 252, TED 254, and the like, may reside in one or more computing devices similar to network device 200.

Trust Information

In mirroring human society, a relationship between message addresses may be employed to represent communities based on various network related activities. Such a community/relationship network may enable, in part, a trust rating for message addresses, domains, and similar network entities.

To accomplish this, trust Server 106 may monitor network traffic and based on an observed traffic pattern assign a trust value to individual email addresses. The trust value for the individual email addresses may include two parts:

1. A relationship trust that is due to a proximity of the sender/recipient email addresses. For example, if the sender is in the recipient's address book, it is likely that the recipient will be able to receive email from this sender regardless of the trust rating of this sender.

2. A universal trust rating that is independent of the recipient and is dependent on the sender address. This universal trust rating can be assigned based on the various network activities.

The total trust rating will be a combination of the relationship trust and the universal trust rating. For example, for sender address A and recipient address B, the composite trust rating for A to B may be:

$$CT(A, B) = UT(A) + T(A, B)$$

where UT(A) is the universal trust rating for A and T(A, B) represents a relationship trust between A and B. Note that either UT(A) or T(A, B) can be positive or negative.

When a subscriber receives a message from A to B, it will send the (A,B) pair to query trust server 106 of FIG. 1. In return, it will get at least the composite trust rating CT(A, B). If this rating is above a predefined threshold to be decided by the subscriber, then A is to be trusted for B. The subscriber may then deliver the message to B's inbox with minimal, if any, spam filtering. If this rating is below another threshold to be decided by the subscriber, then A may be distrusted by B. The subscriber then may deliver the message to B's spam or bulk folder, simply drop or reject the message to the sender, or perform similar actions. If the trust rating is in between, the thresholds, which means A may be neither trusted nor negatively trusted, then the subscriber may apply its own spam filter and deliver the message based on an antispam policy of the recipient.

The trust rating can be assigned to individual email addresses and/or domains. In the case of a domain, a good trust rating can be assigned when all the addresses within the domain are assigned a good or neutral trust rating. In this example, any new email address within the domain will be assigned a good trust rating by default.

Generalized Operation

Figure 3:
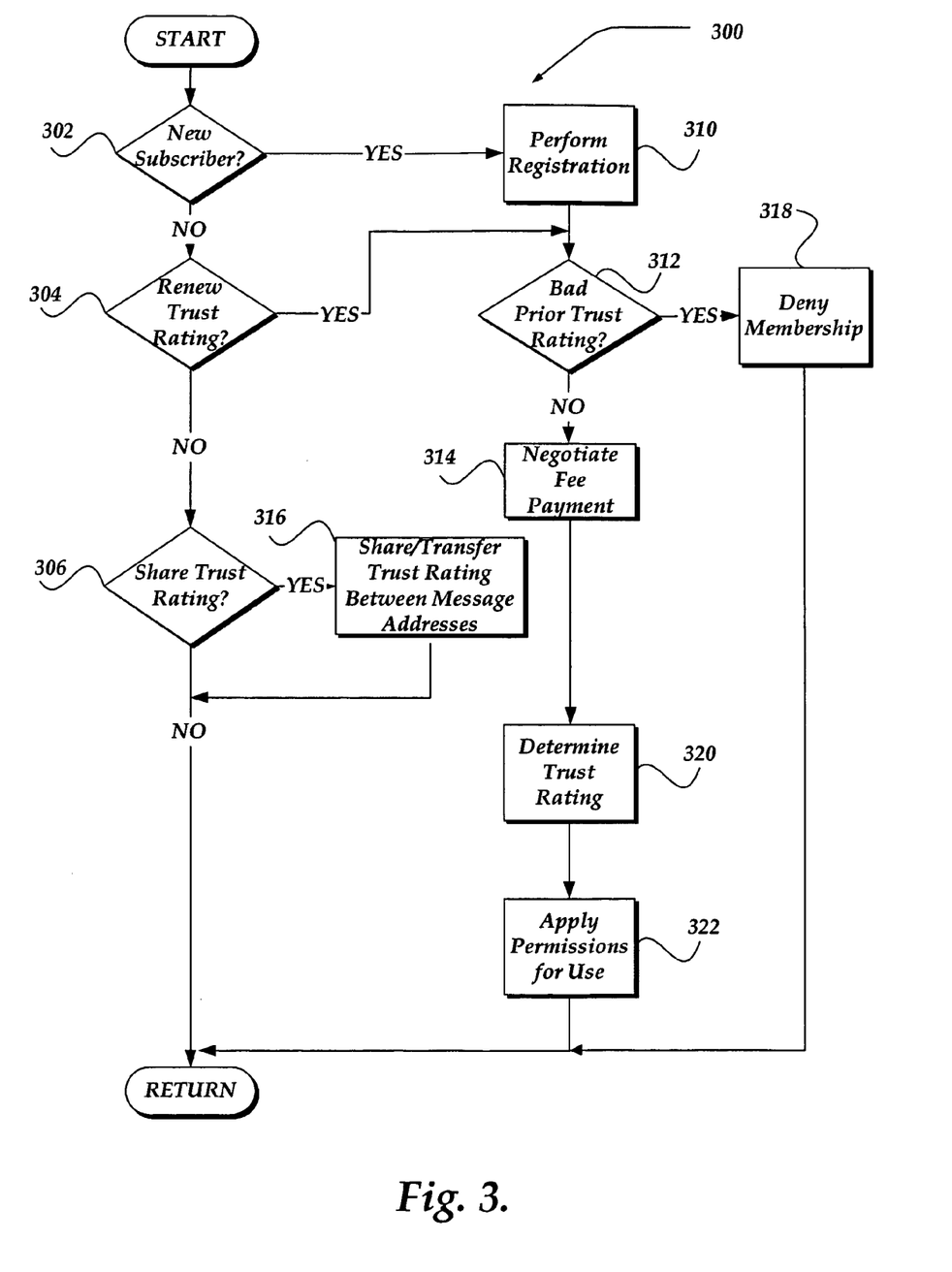
FIG. 3 illustrates a logical flow diagram generally showing one embodiment of a process for managing a subscription to a Trusted Email Database (TED) for sender message address(es) and/or sender domain(s)

The operation of certain aspects of the invention will now be described with respect to FIGS. 3–5. FIG. 3 illustrates a logical flow diagram generally showing one embodiment of a process for managing a "sender" subscription to a Trusted Email Database (TED). This may be used, for example, by the sender to obtain new trust rating or to transfer a prior trust rating with another message address. Subscription process 300 of FIG. 3 may be implemented within trust server 106 of FIG. 1.

Process 300 begins, after a start block, at block 302, when a client enters the TED system. The entering client may represent a single client's address, a domain of client addresses, or similar network entity address(es); however, for ease of illustration the term client is employed herein to represent any of the above. At block 302, a determination is made whether the address associated with the client is a new subscriber. If the client's address is not a new subscriber, processing flows to decision block 304; otherwise, processing branches to block 310.

At decision block 304, a determination is made whether the client seeks to renew a trust rating associated with the client's address. If the client's address is infrequently used, does not have sufficient activity to garner an associative trust with the TED, a predetermined use timer has expired, and the like, processing branches to block 312. If the trust rating for this client's address is not to be renewed, processing branches to decision block 306.

At decision block 312, a determination is made whether the client has a bad prior trust rating. If not, then processing flows to block 314, where the email trust rating may be renewed for a nominal fee; otherwise, processing flows to block 318, where membership is denied. After block 318, processing returns to the calling process to perform other actions.

At decision block 306, a determination is made whether the client requests to have a trust rating associated with one address shared (transferred) to another address. If so, processing branches to block 316; otherwise, processing branches to block 308.

At block 316, the client provides information regarding the addresses, and the trust rating for one address is transferred to or shared with another address. TED will attempt to validate that the addresses are indeed owned by the same entity. If they are successfully validated, then the transfer/sharing proceeds. After the transfer/sharing, both addresses result in the same trust rating as the original address. Processing then returns to a calling process to perform other actions. At block 310, registration of the new client's address is performed. Registration may include, but is not limited to, communicating such information as a place of residence, a name, an alias, a hobby, group associations, activity associations, password information, a public key certificate, and the like. Processing then proceeds to decision block 312, where a determination is made whether there exists any prior information regarding a trust rating for this client's address. Such information may be obtained from a variety of sources, including the TED itself, another source including whois, and the like. For example, the TED system may receive information from a credit rating system, a credit card business, telephone service provider, a financial institution, and the like. In one embodiment, if the information indicates that the client's address is legitimate, an initial universal trust rating may be assigned to the client's address. If, at decision block 312, it is determined that the client's address has a bad trust rating, then processing flows to block 318, where the client address may be denied membership to the TED. In which instance, a message may be sent to the requesting client address indicating denial of membership, or the like. Processing then returns to a calling process to perform other actions. Otherwise, if, at decision block 312, it is determined that the client's address has either has a good or neutral trust rating, processing proceeds to block 314.

At block 314, a fee is negotiated. Negotiation of the fee may include, but is not limited to, obtaining credit card information, confirming the fee, fee transfer, and the like. It is anticipated that a fee for a fixed number of sent messages would discourage spammers that might want to abuse the TED system, simply because of the large economic cost for sending millions of messages. Moreover, this structure is different from a 'sender-pay' model, since the fee may not be required for a vast majority of existing clients, where a prior good trust rating is determined. Additionally, for those that do pay, the vast majority of them would pay just once, and then their activity likely is sufficient to garner a good trust rating. This aspect of the invention may help remove a barrier to acceptance of a sender-pay model, because messages would still be 'mostly' free.

Processing continues next to block 320, where a universal trust rating is determined for the client's address. Where this client's address is a new subscriber, the universal trust rating may be set to a positive value, sufficient to provide for a 'trial period of use.' Processing proceeds next to block 322 where permissions for use are applied. If the client's address is a newly registered, permissions may include, enabling the client's address to send a predetermined number of messages within a certain time frame, and the like. In the case of a domain registration, all of the addresses within the domain would be allowed to send TED subscribers up to a limited number of emails, for the negotiated fee. In one embodiment, the fee may be significantly different for a domain versus a single recipient address.

For example, a newly registered address may be established with a credit of 1000 messages, or the like, that may be sent within say 72 hours. Based on the initial universal trust rating, the registered address would be able to send out 1000 messages without worrying about message rejections by a receiver. However, as illustrated below in conjunction with FIG. 5, the TED system enables a process that protects the receiver mailbox from spam, because just messages sent out by trusted message addresses in the TED system are deposited into an inbox folder. Moreover, if a spammer does acquire a new address with an initial universal trust rating, as soon as the spammer starts spamming, its composite trust value might be decreased to a negative level, or the like, sufficient to result in the disablement of address within TED, The cost of registering new addresses and the limit of number of messages can be sent per registration may make it highly unlikely and/or uneconomical for spammers to abuse the registration process of TED.

As the client address (or domain of client addresses) sends a message within the time frame, the number of messages may be decremented until it reaches zero. By the time that the client address has sent the predetermined number of messages or the time frame has expired, it is anticipated that the TED system will have monitored a sufficient amount of activities such that it may assign a sufficient universal trust rating to this client's address at which point the client's address may enjoy full participation in the TED-based network. It is expected that if the domain, or client address is legitimate, and a good trust rating may be assigned after the initial time frame. In which instance, it is expected that no more payment of fees would be necessary to send further messages to TED subscribers.

Figure 4:
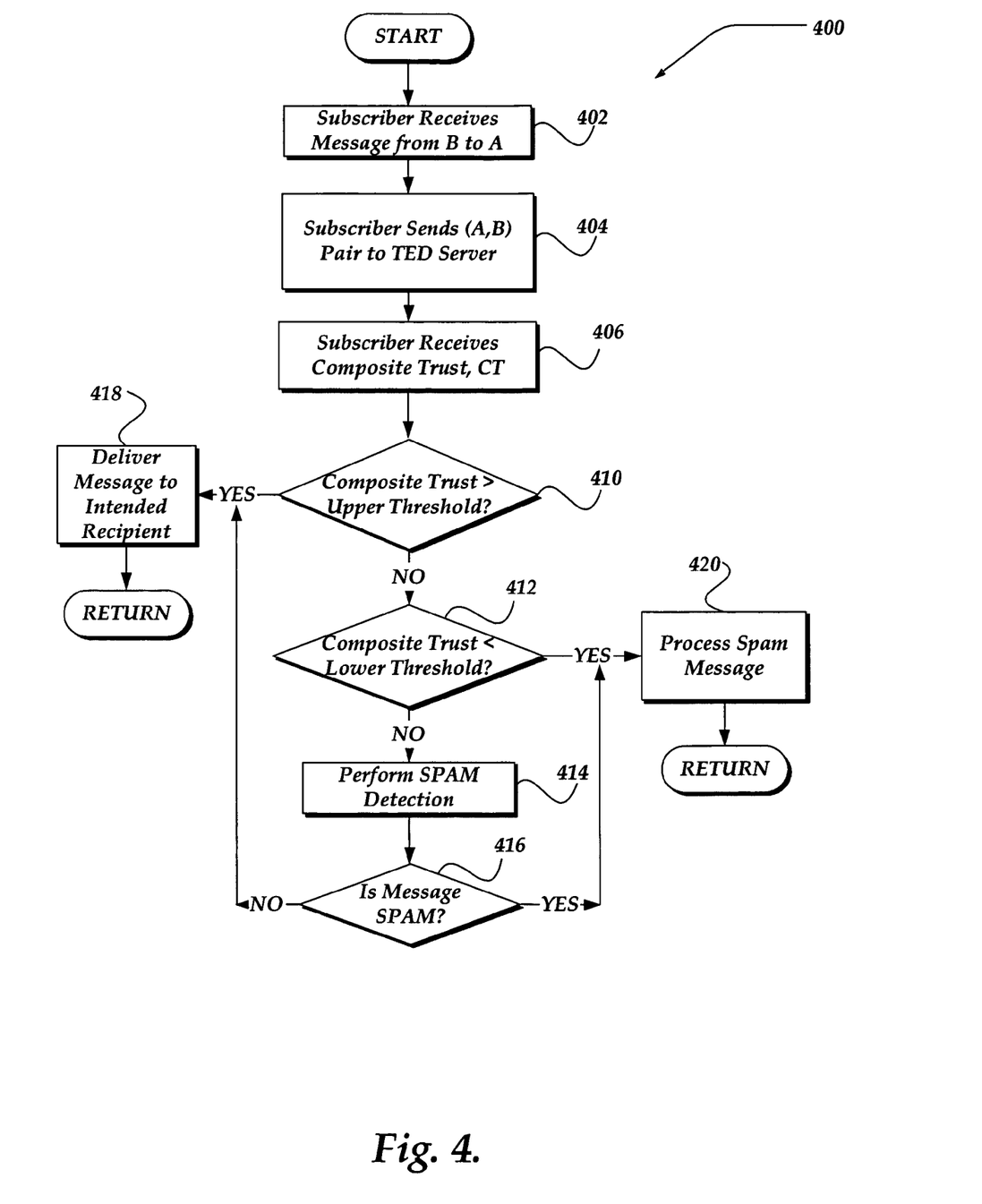
FIG. 4 illustrates a logical flow diagram generally showing one embodiment of a process for enabling a TED subscriber, either a message address end user or an email service provider, to utilize the TED to filter spam messages.

FIG. 4 illustrates a logical flow diagram on how a TED subscriber can utilize the TED to filter spam messages. The subscriber may be an ISP, a corporate email server, and the like, that is configured to deliver messages to end users.

Process 400 of FIG. 4 begins, after a start block, at block 402, where the subscriber receives an email from address sender B for address recipient to A. Address recipient A may be an email address hosted in the subscriber's system, for example.

Process 400 flows next to block 404, where the subscriber sends the recipient/sender (A,B) address pair to the TED to query the trust rating. The subscriber may also send its own credential. In one embodiment, if the message is sent to multiple recipients in the subscriber's system, this process may be repeated for each recipient of the message.

When the TED receives the (A,B) address pair, it may validate the subscriber's credential to validate that the subscriber is actually a subscriber of the TED and is still current to receive trust information. If the subscriber's credential fails, the subscriber's subscription is no longer valid, or the like, the request will be denied by the TED. Otherwise, the TED will process the request. Processing next flows, to block 406, where the TED returns the composite trust rating of the (A,B) address pair to the subscriber, and the subscriber receives the trust rating of (A,B) address pair from the TED. Processing next flows to decision block 410

At decision block 410, a determination is made whether composite trust CT for this message sender is greater than some upper threshold value. The upper threshold may be predetermined to be virtually any value that provides guidance on when to accept a message from the message sender. For example, in one embodiment, the upper threshold value is approximately 0.5. Thus, if composite trust CT is greater than about 0.5, the message sender is determined to have a sufficient level of trust by the intended recipient, and processing branches to block 418. At block 418, the message is delivered to the intended recipient. Process 400 then returns to a calling process to perform other actions.

If, however, composite trust CT is determined, at decision block 410, to not be greater than the upper threshold, processing continues to decision block 412. At decision block 412, a determination is made whether composite trust CT is below a lower threshold. The lower threshold need not be symmetric with the upper threshold, and virtually any value may be selected that provides guidance on when to reject a received message based on insufficient trust. The lower threshold may also be symmetric, however, and in one embodiment, it is set to about −0.5. Thus, if it is determined that composite trust CT is less than the lower threshold, then the sending message address is assumed to be a spammer, unwanted, unsolicited message sender, and the like. Processing branches to block 420, where the message is processed as though it was spam. For example, the message may be delivered to a bulk folder associated with the recipient message address. The message may also be dropped, deleted, and the like. In any event, upon processing the message, process 400 returns to the calling process to perform other actions.

If, however, at decision block 412, composite trust CT is not less than the lower threshold, that is, if composite trust CT is between the upper and lower thresholds, processing proceeds to block 414, where a spam filter may be applied to the message. Virtually any spam filtering mechanism may be employed, including, but not limited to, content checking, checking for forged message addresses, and the like.

Processing then proceeds to decision block 416, where a determination is made, based on a result from block 414, whether the message is detected as spam. If it is determined that the message is not spam, processing branches back to block 418, where the message is delivered to the intended recipient, as described above. Otherwise, processing branches to block 420, to proceed as described above. In any event, upon completion of processing, process 400 returns to the calling process to perform other actions.

In this flow, the threshold may be determined by a policy of subscriber, based on its own tolerance to spam and/or missed email, although the TED can provide some guidance on what the default threshold should generally be.

Figure 5:
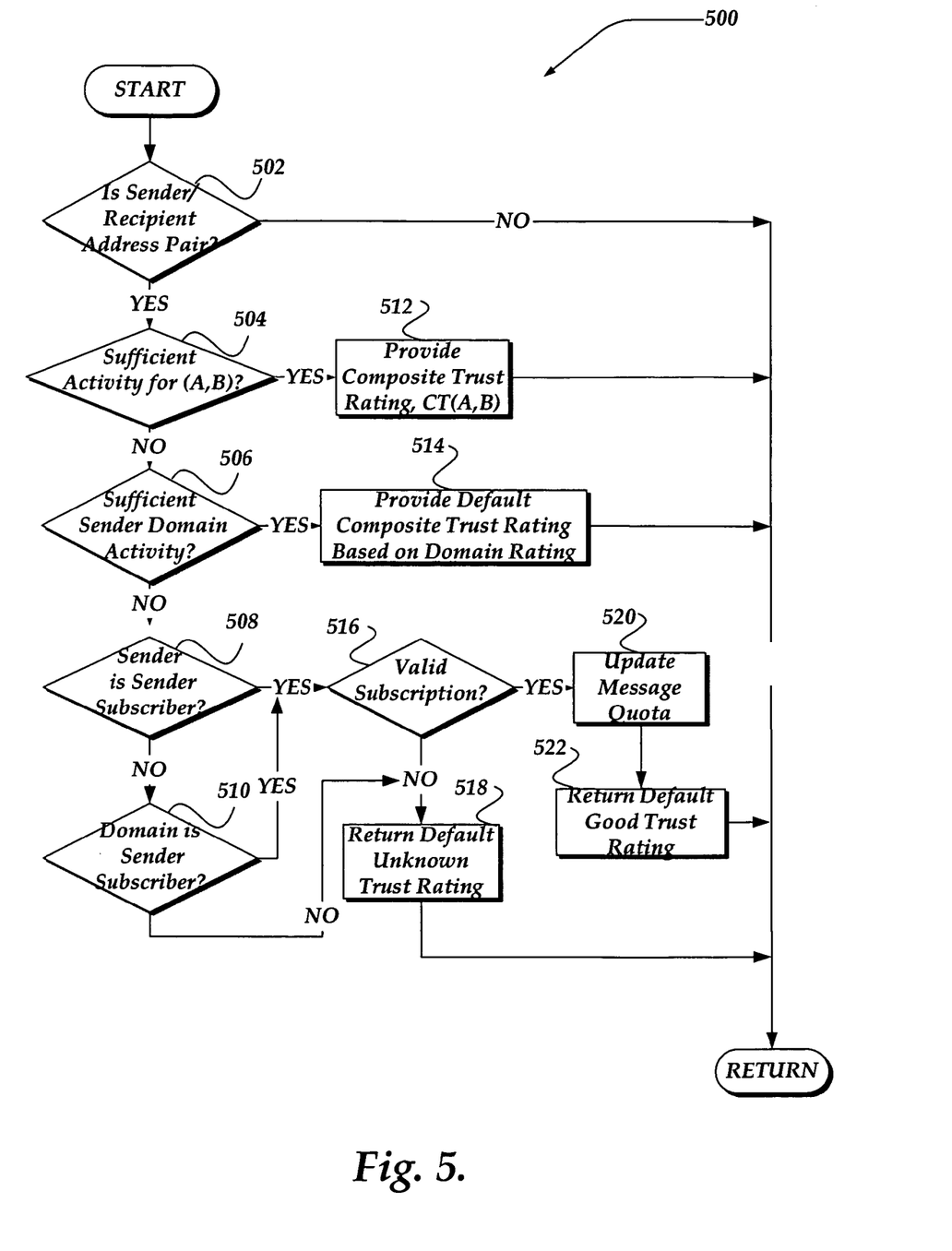
FIG. 5 illustrates a logical flow diagram generally showing one embodiment of a process for managing a recipient trust rating query to the TED, in accordance with the invention.

FIG. 5 illustrates a logical flow diagram generally showing one embodiment of a process for managing a recipient trust rating query to the TED, in accordance with the invention. Process 500 of FIG. 5, for example, enables a subscriber to query a trust rating. In any event, process 500 may be entered, after a start block, at decision block 502, where TED has received a query from a valid subscriber. At decision block 502, a determination is made whether the subscriber has provided a sender/recipient address pair as part of the query. The request may be rejected if either the sender or the recipient address is missing or incomplete. For example, if the sender address is missing a username (with only domain information), the request may be rejected. In any event, if the sender/recipient address pair is missing or incomplete, process 500 returns to a calling process. Otherwise, the process flows to decision block 504, where the TED proceeds to lookup within its activity database to determine the composite trust rating for the recipient/sender address pair.

At decision block 504, a determination is made whether there is sufficient activity for the TED to determine the trust rating. Such activity may be based on a variety of factors, including whether there is an indirect relationship activity between the sender and the recipient, and a third party, or the like. If there is sufficient activity, processing flows to block 512, where the composite trust rating for the sender/recipient address pair is provided. Processing then returns to the calling process.

If, at decision block 504, it is determined that there is not sufficient activity to determine a direct composite trust rating between the sender and the recipient address, processing flows to decision block 506. At decision block 506, the TED will lookup the sender's domain to see if there is a default trust rating associated with the domain, and whether there is sufficient activity within the sender's domain. If there is sufficient domain activity, processing flows to block 514, where the domain trust rating is employed to provide a default composite trust rating. Processing then returns to the calling process.

If, however, at decision block 506, it is determined that neither the sender address nor the sender domain has sufficient activity to determine its trust rating, processing flows to decision block 508, where the TED looks up the sender address to determine if it is one of its sender subscribers. A sender subscriber includes any message address that subscribes to the TED to obtain a sender trust rating and to send messages to another address, based in part on that trust rating.

If, at decision block 508, it is determined that the sender address is a sender subscriber of the TED, processing flows to decision block 516, where a determination is made whether the sender address includes a valid subscription. A valid subscription may be based on, for example, whether the subscription has expired, been revoked, and the like, and whether an associated message quota has not been exhausted. If the subscription is valid, processing continues to block 520, where the TED will then deduct one message count from the sender subscriber's message quota. Processing then continues to block 522, where a default good trust rating is provided. Processing then returns to the calling process. If, however, at decision block 516, the subscription is not valid, processing flows to block 518, where an unknown trust rating is provided. Processing then returns to the calling process.

However, if at decision block 508, the sender address does not include a sender subscription, processing continues to block 510, where a determination is made whether the sender address is included within a domain that has a sender subscription. If it is determined that the domain includes a sender subscription, processing flows to decision block 516, to perform as described above, except that at block 520, the message quota that is decremented is now associated with the domain. If, at decision block 510, the domain is not include a sender subscription, then processing flows to block 518, where an unknown trust rating is provided. Processing then returns to the calling process. It is then up to the subscriber to decide how it should handle this message.

The above process may happen with new sender address or sender domain that have not registered or subscribed with TED.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for managing a subscription over a network, comprising:
   receiving a request for a sender subscription to a trusted email database from a client address;
     determining whether the client address is initially trustable, and if the client address is initially trustable, subscribing the client address to the trusted email database, and enabling the client address to send a predetermined number of messages within a predetermined time frame;
     if it is indeterminate whether the client address is initially trustable, negotiating a fee payment prior to subscribing the client address to the trusted email database and enabling the client to send the predetermined number of messages within the predetermined time frame;
     monitoring information associated with the client address as reported by other address;
     determining a universal trust rating for the client address based, in part, on the monitored information, wherein the universal trust rating is a property of the client address, and not a property of the destination message address; and
     if the Universal trust rating indicates that the client message is untrustable, disabling the client sender subscription from the trusted email database.

2. The method of claim 1, further comprising, enabling the subscribed client address to share a trust rating with another client address, if both addresses are verified to be belong to a same entity.

3. The method of claim 1, further comprising, if the client address does not send the predetermined number of messages within the predetermined time frame, negotiating a fee payment to enable renewal of the client address's subscription to the trusted email database.

4. The method of claim 1, wherein determining whether the client address is initially trustable further comprises employing information from at least one of a credit rating system, a credit card business, telephone service provider, a financial institution, a whois query, and from the trusted email database.

5. The method of claim 1, further comprising, enabling the subscribed client address to query the trusted email database to determine a trust rating associated with at least one of a message address sender/client address pair, a message address sender, and the client address.

6. The method of claim 5, wherein the trust rating for the message address sender/client address pair further comprises a rating based on at least a combination of a proximity trust relationship and a universal trust rating associated with the message address sender that is independent of the subscribed client address.

7. The method of claim 1, wherein monitoring information associated with each messages sent by the client address further comprises:
   determining a proximity trust relationship between the client address and the destination message address; and
   if at least a combination of the proximity trust relationship and the universal trust relationship indicate that the client address is trustable, providing the message to an inbox associated with the destination message address.

8. The method of claim 7, wherein the combination further comprises at least one of a sum, and a weighted sum of the proximity trust relationship and the universal trust rating.

9. The method of claim 7, wherein determining the proximity trust relationship further comprises determining a degree of separation between the sending message address and the destination message address.

10. The method of claim 9, wherein determining the degree of separation further comprises employing an address relationship graph.

11. The method of claim 1, wherein determining the universal trust rating further comprises modifying the universal trust rating for the client message address based, in part, on another universal trust rating associated with the destination message address.

12. The method of claim 1, wherein determining the universal trust rating further comprises:
   determining another universal trust rating associated with the destination message address;
   determining a proximity trust relationship between the destination message address and the client address; and employing the other universal trust rating and the proximity trust relationship to determine the universal trust rating for the client message address.

13. The method of claim 1, wherein determining the universal trust rating for the client address further comprises, determining the universal trust rating based, in part, on an online activity associated with at least one of sending a message by the client address, forwarding a message from the client address, deleting a message received by the client address, blocking a message by the client address, the client address responding to a message, the client address marking a message as spain, the client address marking a message as not spain, and the client address saving a message address.

14. A method for managing a subscription over a network, comprising:
  receiving a request for a recipient subscription to a trusted email database from a client address;
  determining whether the client address is initially trustable, and if the client address is initially trustable, subscribing the client address to the trusted email database,
  if it is indeterminate whether the client address is initially trustable, negotiating a fee payment prior to subscribing the client address to the trusted email database and enabling the client to send the predetermined number of messages within the predetermined time frame; and
  enabling the subscribed client address to query the trusted email database to determine a trust rating associated with at least one of a message address sender/client address pair, a message address sender, and the client address, wherein the trust rating for the message address sender/client address paid further comprises a rating based on at least a combination of a proximity trust relationship, and a universal rating associated with the message address sender, wherein the universal trust rating is a property of the client address, and not a property of the destination message address; and
  if a fee is to be charged, charging the fee for enabling the query to the trusted email database.

15. A server for managing messages over a network, comprising:
  a database that is configured to store trust information; and
  a trust manager, coupled to the database, that is configured to perform actions, including:
  receiving a request for a subscription to a trusted email database from a client address;
  determining whether the client address is initially trustable, and if the client address is initially trustable, subscribing the client address to the trusted email database and enabling the client address to send a predetermined number of messages within a predetermined time frame;
  if it is indeterminate whether the client address is initially trustable, negotiating a fee payment prior to subscribing the client address to the trusted email database and enabling the client to send the predetermined number of messages within the predetermined time frame;
  monitoring information associated with the each message sent by the client address to a destination address;
  determining a universal trust rating for the client address based, in part, on the monitored information, wherein the universal trust rating is a property of the client address, and not a property of the destination message address; and
  enabling the client to send the predetermined number of messages within the predetermined time frame;
  monitoring information associated with the each message sent by the client address to a destination address;
  determining a universal trust rating for the client address based, in part, on the monitored information, wherein the universal trust rating is a property of the client address, and not a property of the destination addresses; and
  if the universal trust rating indicates that the client message is untrustable, disabling the client sender subscription from the trusted email database.

16. The server of claim 15, wherein in determining the universal trust rating further comprises;
  if the destination address is associated with a positive universal trust rating and has a positive proximity trust relationship with the client address, increasing the determined universal trust rating for the client address by a factor based on a first predetermined value times the proximity trust relationship;
  if the destination address is in a good cluster of addresses and has a negative proximity trust relationship with the client address, decreasing the determined universal trust rating for the client address by a factor based on a second predetermined value time the proximity trust relationship; and
  if the destination address has a positive proximity trust relationship with the client address and the client address is in a bad cluster of addresses, decreasing the universal trust rating of the destination address by a factor based on a third predetermined value times a relationship strength between the client address and the destination address.

17. The server of claim 15, further comprising, enabling the subscribed client address to transfer the universal trust rating to another client address.

18. The server of claim 15, further comprising, if the client address does not send the predetermined number of messages within the predetermined time frame, negotiating a fee payment to enable renewal of the client address's subscription to the trusted email database.

19. The server of claim 15, further comprising, enabling the subscribed client address to query the trusted email database to determine a trust rating associated with at least one of a message address sender/client address pair, a message address sender, and the client address.

20. The server of claim 15, wherein determining the universal trust rating further comprises modifying the universal trust rating for the client message address based, in part, on another universal trust rating associated with the destination message address.

21. A server for managing messages over a network comprising:
  a database that is configured to store trust information; and a trust manager, coupled to the database, that is configured to perform actions, including:
  receiving a request for a recipient subscription to a trusted email database from a client address;
  determining whether the client address is initially trustable, and if the client address is initially trustable, subscribing the client address to the trusted email database and enabling the subscribed client address to query the trusted email database to determine a universal trust rating associated with at least one of a message address sender/client address pair, a message address sender, and the client address, wherein the universal trust rating is a property of the client address, and not a property of the destination message address; and if it is indeterminate whether the client address is initially trustable, negotiating a fee payment prior to subscribing the client address to the trusted email database and enabling the client to query the trusted email database to determine a trust rating for a predetermined number of messages within a predetermined time frame.

22. A computer-readable medium having computer-executable instructions for managing messages over a network, the computer-executable instructions being operative to perform actions, comprising:

enabling a receiving of a request for a recipient subscription to a trusted email database from a client address;

enabling a determination of whether the client address is initially trustable, and if the client address is initially trustable, enabling the client to send the predetermined number of messages within the predetermined time frame;

enabling the client address to query the trusted email database to determine a universal trust rating associated with at least one of a message address sender/client address pair, a message address sender, and the client address, wherein the universal trust rating is a property of the client address, and not a property of the destination message address; and determining whether to charge a fee to enable the query of the trusted email database, wherein the determination to charge the fee is based, at least in part, on a trust rating associated with the client address, if it is indeterminate whether the client address is initially trustable, negotiating a fee payment prior to subscribing the client address to the trusted email database and enabling the client to send the predetermined number of messages within the predetermined time frame.

23. A computer-readable medium having computer-executable instructions for managing messages over a network, the computer-executable instructions being operative to perform actions, comprising:

enabling a receiving of a request for a subscription to a trusted email database from a client address;

enabling a determination of whether the client address is initially trustable, and if the client address is initially trustable, enabling the client address to send a predetermined number of messages within a predetermined time frame;

enabling a monitoring of information associated with the each message sent by the client address to a destination address;

enabling a determining of a universal trust rating for the client address based, in part, on the monitored information, wherein the universal trust rating is a property of the client address, and not a property of the destination message address; and if the universal trust rating indicates that the client message is untrustable, enabling a disabling of the client sender subscription from the trusted email database;

if it is indeterminate whether the client address is initially trustable, negotiating a fee payment prior to subscribing the client address to the trusted email database and enabling the client to send the predetermined number of messages within the predetermined time frame.

24. The computer-readable medium of claim 23, wherein determining whether the client address is initially trustable further comprises employing information from at least one of a credit rating system, a credit card business, telephone service provider, a financial institution, a whois query, and from the trusted email database.

25. The computer-readable medium of claim 23, wherein determining the universal trust rating further comprises modifying the universal trust rating for the client message address based, in part, on another universal trust rating associated with the destination message address.

26. An apparatus for managing messages on a network, comprising:

a means for receiving a request for a subscription to a trusted email database from a client address;

a means for determining whether the client address is initially trustable, and if the client address is determined to be initially trustable, a means for enabling the client address to send a predetermined number of messages within a predetermined time frame;

a means for monitoring information associated with the each message sent by the client address to a destination address;

a means for determining a universal trust rating for the client address based, in part, on the monitored information, wherein the universal trust rating is a property of the client address, and not a property of the destination message address; and if the universal trust rating indicates that the client message is untrustable, a means for disabling the client message from the trusted email database, if it is indeterminate whether the client address is initially trustable, negotiating a fee payment prior to subscribing the client address to the trusted email database and enabling the client to send the predetermined number of messages within the predetermined time frame.

* * * * *

UNITED STATES PATENT AND TRADEMARK OFFICE
CERTIFICATE OF CORRECTION

PATENT NO. : 7,181,764 B2 Page 1 of 1
APPLICATION NO. : 10/975698
DATED : February 20, 2007
INVENTOR(S) : Zhu et al.

It is certified that error appears in the above-identified patent and that said Letters Patent is hereby corrected as shown below:

In column 10, line 43, delete "uneconomical" and insert-- un-economical --, therefor.
In column 11, line 18, after "410" insert -- . --.
In column 14, line 2, in Claim 1, after "other" delete "address;" and insert -- addresses; --, therefor.
In column 14, line 8, in Claim 1, delete "Universal" and insert -- universal --, therefor.
In column 15, line 12, in Claim 13, delete "spain," and insert -- spam, --, therefor.
In column 15, line 13, in Claim 13, delete "spain," and insert -- spam, --, therefor.
In column 15 and 16, lines 65-67 and 1-8, in Claim 15, after "and" delete "enabling the client to send the predetermined number of messages within the predetermined time frame; monitoring information associated with the each message sent by the client address to a destination address; determining a universal trust rating for the client address based, in part, on the monitored information, wherein the universal trust rating is a property of the client address, and not a property of the destination addresses; and".
In column 16, line 53, in Claim 21, delete "network" and insert -- network, --, therefor.

Signed and Sealed this

First Day of May, 2007

JON W. DUDAS
*Director of the United States Patent and Trademark Office*